(12) United States Patent
Mannari

(10) Patent No.: US 9,879,140 B2
(45) Date of Patent: Jan. 30, 2018

(54) CORROSION-RESISTANT COATINGS AND METHODS USING POLYUREASIL PRECURSORS

(71) Applicant: EASTERN MICHIGAN UNIVERSITY, Ypsilanti, MI (US)

(72) Inventor: Vijaykumar M. Mannari, Saline, MI (US)

(73) Assignee: EASTERN MICHIGAN UNIVERSITY, Ypsilanti, MI (US)

(*) Notice: Subject to any disclaimer, the term of this patent is extended or adjusted under 35 U.S.C. 154(b) by 141 days.

(21) Appl. No.: 14/526,679

(22) Filed: Oct. 29, 2014

(65) Prior Publication Data

US 2015/0051340 A1    Feb. 19, 2015

Related U.S. Application Data

(62) Division of application No. 13/439,970, filed on Apr. 5, 2012, now Pat. No. 8,900,668.

(Continued)

(51) Int. Cl.
*C09D 5/08* (2006.01)
*C09D 175/12* (2006.01)
(Continued)

(52) U.S. Cl.
CPC ............ *C09D 5/08* (2013.01); *B05D 3/108* (2013.01); *B05D 7/54* (2013.01); *C08G 18/289* (2013.01);
(Continued)

(58) Field of Classification Search
CPC .... C08G 18/289; C08G 18/73; C08G 18/755; C08G 18/7621; C09D 175/04;
(Continued)

(56) References Cited

U.S. PATENT DOCUMENTS 3,895,043 A   7/1975   Wagner et al.
5,306,765 A   4/1994   Kuriyama et al.
(Continued)

OTHER PUBLICATIONS

Amirudin et al., Application of Electrochemical Impedance Spectroscopy to Study the Degradation of Polymer-Coated Metals, Prog. Org. Coat. 26 (1995) 1-28.

(Continued)

*Primary Examiner* — Thao T Tran
(74) *Attorney, Agent, or Firm* — Marshall, Gerstein & Borun LLP

(57) ABSTRACT

The disclosure relates to curable polyureasil compounds, methods related to curing of such compounds via hydrolysis and/or condensation to form coatings on a substrate, and coated articles formed from the curable polyureasil compounds. The polyureasil compounds are generally hydrocarbon-based, including multiple urea groups and multiple hydrolysable silyl groups per molecule. The hydrolysable silyl groups can be hydrolyzed and subsequently condensed to provide a networked polymeric structure with siloxane/urea linkages between polyureasil compound precursors to form a cured polyureasil composition useful as a coating for a substrate, in particular an anti-corrosion coating for a metallic substrate.

15 Claims, 3 Drawing Sheets

Related U.S. Application Data

(60) Provisional application No. 61/474,096, filed on Apr. 11, 2011.

(51) Int. Cl.
*B05D 3/10* (2006.01)
*B05D 7/00* (2006.01)
*C08G 18/73* (2006.01)
*C08G 18/75* (2006.01)
*C08G 18/76* (2006.01)
*C09D 175/04* (2006.01)
*C08G 18/28* (2006.01)
*C23C 18/12* (2006.01)
*B05D 1/02* (2006.01)
*B05D 1/18* (2006.01)

(52) U.S. Cl.
CPC ............ *C08G 18/73* (2013.01); *C08G 18/755* (2013.01); *C08G 18/7621* (2013.01); *C09D 175/04* (2013.01); *C09D 175/12* (2013.01); *C23C 18/122* (2013.01); *B05D 1/02* (2013.01); *B05D 1/18* (2013.01); *B05D 2202/25* (2013.01); *Y10T 428/31554* (2015.04); *Y10T 428/31605* (2015.04)

(58) Field of Classification Search
CPC ...... C09D 175/12; C09D 5/08; C23C 18/122; Y10T 428/31605; B05D 1/02; B05D 1/18; B05D 2202/25; B05D 3/108; B05D 7/54
USPC .......................................................... 524/588
See application file for complete search history.

(56) References Cited

U.S. PATENT DOCUMENTS

| | | | | |
|---|---|---|---|---|
| 6,117,552 | A * | 9/2000 | Hanada et al. | 428/32.34 |
| 2004/0139887 | A1* | 7/2004 | Zhang | 106/287.11 |
| 2005/0245716 | A1* | 11/2005 | Jansen et al. | 528/44 |
| 2008/0125529 | A1* | 5/2008 | Austermann | C08G 18/10 524/266 |
| 2008/0233390 | A1* | 9/2008 | Gothlich | C08F 220/06 428/336 |
| 2010/0083871 | A1 | 4/2010 | Narayan et al. | |
| 2010/0247785 | A1* | 9/2010 | Martz | C09D 183/04 427/387 |
| 2011/0319555 | A1* | 12/2011 | Iezzi | C09D 175/02 524/588 |

OTHER PUBLICATIONS

Balbyshev et al., Investigation of Quaternary Al-Based Quasicrystal Thin Films for Corrosion Protection, Thin Solid Films 447-448 (2004), 558-563.
Donley et al., Self-Assembled NAnophase Particle (SNAP) Surface Treatments for Corrosion Protection of AA2024-T3, Prog. Org. Coatings 52 (2005), 34-38.
Jeffcoate et al., Electrochemical Assessment of Spray-Applied Thermoplastic Coating Barrier Properties, J. Mater. Eng. Perform. (1997) 6:417-420.
Kakde et al., High-Performance Chrome-Free Pretreatments for Aerospace Al-Alloys—Harnessing Sol-Gel Technology, ICE presentation (2007).
Kakde et al., Novel Chrome-Free Pretreatment for Aluminum Alloys, ACE presentation (2008).
Kakde et al., Advanced Chrome-Free Organic-Inorganic Hybrid Pretreatments for Aerospace Aluminum Alloy 2024-T3-Application of Novel Bis-Ureasil Sol-Gel Precursors, J. Coat. Technol. Res., vol. 6, No. 2, (2008) 201-211.
Khramov et al., Nanostructured Sol-Gel Derived Conversion Coatings Based on Epoxy- and Amino-Silanes, Prog. Org. Coatings 47 (2003) 207-213.
Lamaka et al., TiOx Self-Assembled Networks Prepared by Templating Approach as Nanostructured Reservoirs for Self-Healing Anticorrosion Pre-Treatments, Electro. Comm. 8 (2006) 421-428.
Mannari, V., Organic-Inorganic Hybrid Pretreatments for Industrial Aluminum Alloys Using Novel Sol-Gel Process, SAE International 2011 presentation, (presented Apr. 14, 2011).
Metroke et al., Corrosion Resistance Properties of Ormosil Coatings on 2024-T3 Aluminum Alloy, Prog. Org. Coat. 50 (2004) 231-246.
Parkhill et al., Application and Evaluation of Environmentally Compliant Spray-Coated Ormosil Films as Corrosion Resistant Treatments for Aluminum 2024-T3, Prog. Org. Coat. 41 (2004) 261-265.
Voevodin et al., An Organically Modified Zirconate Film as a Corrosion-Resistant Treatment for Aluminum 2024-T3, Prog. Org. Coat. 41 (2001) 287-293.
Voevodin et al., Investigation of Corrosion Protection Performance of Sol-Gel Coatings on AA2024-T3, Prog. Org. Coat. 52 (2005) 28-33.
Zheludkevich et al., Nanostructured Sol-Gel Coatings Doped With Cerium Nitrate as Pre-Treatments for AA2024-T3 Corrosion Protection Performance, Electrochimica Acta 51 (2005) 208-217.

\* cited by examiner

CORROSION-RESISTANT COATINGS AND METHODS USING POLYUREASIL PRECURSORS

CROSS-REFERENCE TO RELATED APPLICATIONS

This application is a division of U.S. patent application Ser. No. 13/439,970, filed Apr. 5, 2012, which claims the priority benefit of U.S. Provisional Patent Application No. 61/474,096, filed Apr. 11, 2011, the disclosures of which are incorporated herein by reference in their entireties.

STATEMENT OF GOVERNMENT INTEREST

This invention was made with government support from the Air Force Research Laboratory through grant award no. FA8650-05-D-55807 (subcontract 06-5568-BH-C1). The government has certain rights in the invention.

BACKGROUND OF THE DISCLOSURE

Field of the Disclosure

The disclosure relates to curable polyureasil compounds, methods related to curing of such compounds via hydrolysis and/or condensation to form coatings on a substrate, and coated articles formed from the curable polyureasil compounds.

Brief Description of Related Technology

Aluminum and aluminum alloys (AA) are important materials, mainly for aerospace applications among many others. Protection of aluminum-based materials from atmospheric corrosion is important for long term durability and costs associated with their maintenance. Aircraft coatings are designed to provide long-lasting corrosion and abrasion protection in addition to decorative functions. The coating system is typically comprised of a conversion coating layer, a primer layer, and a topcoat layer.

A conversion coating is a type of coating deposited at the metal surface such that it is strongly adherent and covalently bonded to the surface, thus providing excellent adhesion and a barrier for corrosive elements. Additionally, it provides for good adhesion of the primer layer to its surface. Thus, conversion coatings (surface pretreatments) have an important role in the success of a composite coating system such as used for aircraft.

Among available technologies for surface pretreatments, chromate conversion coatings are by far the most efficient for aluminum and alloys. These coatings are typically applied from acidic mixtures of soluble hexavalent chromium salts by oxidation-reduction reactions with the metal surface. A continuous layer of insoluble trivalent chromium and soluble hexavalent chromium compounds are formed. The use of chromates in the coating has generated serious environmental and health issues for the coating industry because hexavalent chromates are carcinogenic and highly toxic [1]. The costs associated with worker safety and the containment, treatment, and disposal of hazardous materials related to the coating process is one of the highest costs for maintenance activities in the Air Force [2]. Recent legislation, however, substantially limits the use of chromate-based coatings.

SUMMARY

Chromium alternatives have been explored with the goal of developing environmentally benign conversion coatings with comparable performance of chromate-based ones [3], such as organic-inorganic hybrid thin films formed through sol-gel processing [4-16]. Organic-inorganic hybrid materials (also referred to as ormosils or ceramers or ormocers) are formed by hydrolysis and condensation of organically modified silanes or other metals with traditional alkoxide precursors (such as tetraethoxysilane (TEOS) or tetramethoxysilane (TMOS), or metal alkoxides of Zr, Ti, Al etc.) by a sol-gel method [17-18]. Sol-gel chemistry is useful in a wide range of thin film applications and has the potential to incorporate chemically tailored features aimed at the development of corrosion resistance through the use of structurally modified reactants [19-29]. For example, forming functionalized silica nanoparticles in-situ in an aqueous sol-gel process, and then cross-linking the nanoparticles to form a thin film has been successful [22-27].

Deposition of organic-inorganic hybrid coating films involves complex hydrolysis and condensation reactions [28]. In most cases, the sol-gel precursors, the metal/silicon alkoxides and organoalkoxysilanes are simultaneously hydrolyzed in a dilute aqueous solution, under controlled pH conditions. Typical metal/silicon alkoxides used are tetraethoxyorthosilicate (TEOS), tetramethoxyorthosilicate (TMOS), zirconium tetra isopropoxide, and titanium tetraisopropoxide. During this process, metal/silicon alkoxides and organoalkoxysilanes hydrolyze, at significantly different rates, to generate silanol (SiOH) groups and silanol-functional silica networks (nanoparticles). This solution is then applied onto a (metal) substrate and cured under varying conditions. Sufficient numbers of silanol groups should be present before application of the sols on to the substrate, in order to form a dense cross-linked network with sufficient covalent bonding with substrate.

The disclosure generally relates to organic-inorganic hybrid coatings with excellent resistance properties. In various aspects, corrosion-resistant coatings can be derived by one or more of (a) selecting the chemical structure and degree of functionality of curable coating precursors, (b) selecting hydrolysis/condensation reaction conditions and reactant mixture components for the sol-gel precursors to control the structure of the resulting cured coating, (c) selecting suitable corrosion inhibitors for inclusion in the coating, (d) controlling the relative ratio of organic and inorganic components in the cured coatings, (e) controlling the relative proportion of water and organic solvent (e.g., alcohols) for the precursor mixture, and (f) selecting suitable cure conditions for an applied coating. The resulting coatings are dense, adherent coatings with excellent corrosion resistance as characterized by several standard metrics (e.g., salt spray fog test, boiling water test, potentiodynamic scanning).

In one aspect, the disclosure relates to a curable polyureasil compound comprising: (a) a hydrocarbon moiety comprising at least 2 urea groups bonded thereto; and (b) more than 6 hydrolysable silyl groups linked to the hydrocarbon moiety via at least one of the urea groups.

In another aspect, the disclosure relates to a process for curing a curable polyureasil compound, the process comprising: (a) providing a curable polyureasil compound according to any of the variously disclosed embodiments; and (b) curing the curable polyureasil compound with water, thereby hydrolyzing and condensing at least some of the hydrolysable silyl groups to form a cured polyureasil compound comprising covalent intermolecular siloxane cross-links in the cured polyureasil compound. In a refinement, providing the curable polyureasil compound in part (a) comprises providing a mixture comprising: (i) the curable polyureasil compound, (ii) an organic solvent for the curable polyureasil compound, (iii) water, (iv) a catalyst, (v) optionally a corrosion inhibitor; and (vi) optionally a silane crosslinker. In another refinement, the process further comprises: (c) applying partially cured polyureasil compound from part (b) to a substrate; and (d) further curing the partially cured polyureasil compound on the substrate, thereby forming the cured polyureasil compound as a coating on the substrate.

In another aspect, the disclosure relates to a process for curing a curable polyureasil compound, the process comprising: (a) providing a mixture comprising: (i) a curable polyureasil compound comprising (A) a hydrocarbon moiety comprising at least 2 urea groups and (B) at least 6 hydrolysable silyl groups linked to the hydrocarbon moiety via at least one of the urea groups, (ii) an organic solvent for the curable polyureasil compound, (iii) water, (iv) a catalyst, and (v) optionally a corrosion inhibitor; and (b) curing the curable polyureasil compound with water in the mixture, thereby hydrolyzing and condensing at least some of the hydrolysable silyl groups to form a cured polyureasil compound comprising covalent intermolecular siloxane crosslinks in the cured polyureasil compound; wherein the curable polyureasil compound is the only source of intermolecular siloxane crosslinks the mixture. In a refinement, the process further comprises (c) applying partially cured polyureasil compound from part (b) to a substrate; and (d) further curing the partially cured polyureasil compound on the substrate, thereby forming the cured polyureasil compound as a coating on the substrate.

Various refinements and extensions of the foregoing compounds, compositions, and methods are possible. For example, the hydrolysable silyl groups can be selected from the group consisting of methoxy groups, ethoxy groups, and combinations thereof bound to two or more silicon atoms. In an embodiment, the curable polyureasil compound has a number of hydrolysable silyl groups ranging from 6 or 9 to 18 or 24. In another embodiment, the hydrocarbon moiety has a structure corresponding to a reaction product resulting from an amination reaction of a polyisocyanate with an aminosilane.

In another refinement, (i) the curable polyureasil compound comprises a compound having the formula (I):

R—[—NR$_3$—CO—NA$_1$A$_2$]$_x$;     (I)

(ii) R is selected from the group consisting of hydrocarbons containing from 1 to 50 carbon atoms and heteroatom-substituted hydrocarbons containing from 1 to 50 carbon atoms; (iii) A$_1$ is represented by —R$_1$—Si(R$_3$)$_{3-y}$X$_y$; (iv) A$_2$ is represented by —R$_2$—Si(R$_3$)$_{3-z}$X$_z$ or H or R$_3$; (v) X is a hydrolysable group independently selected from the group consisting of alkoxy groups, aryloxy groups, carboxyloxy groups, and halogens; (vi) R$_1$ and R$_2$ are independently selected from the group consisting of hydrocarbons containing from 1 to 20 carbon atoms and heteroatom-substituted hydrocarbons containing from 1 to 20 carbon atoms; (vii) R$_3$ is independently selected from the group consisting of H, hydrocarbons containing from 1 to 20 carbon atoms, and heteroatom-substituted hydrocarbons containing from 1 to 20 carbon atoms; (viii) x is at least 2; (ix) y is 1, 2, or 3; (x) z is 1, 2, or 3 when A$_2$ is not H or R$_3$; and (xi) the number of hydrolysable groups X is at least 6 or more than 6. In a further refinement, (i) A$_1$ is represented by —C$_3$H$_6$—Si(OCH$_3$)$_3$ or —C$_3$H$_6$—Si(OC$_2$H$_5$)$_3$ and (ii) A$_2$ is represented by H. In another further refinement, (i) A$_1$ is represented by —C$_3$H$_6$—Si(OCH$_3$)$_3$ or —C$_3$H$_6$—Si(OC$_2$H$_5$)$_3$ and (ii) A$_2$ is represented by —C$_3$H$_6$—Si(OCH$_3$)$_3$ or —C$_3$H$_6$—Si(OC$_2$H$_5$)$_3$.

In another aspect, the disclosure relates to a coated composite article comprising: (a) a substrate; and (b) a cured polyureasil compound as a coating on a surface of the substrate, the cured polyureasil compound coating comprising the hydrolysis and condensation reaction product of (i) a curable polyureasil compound comprising (A) a hydrocarbon moiety comprising at least 2 urea groups and (B) more than 6 hydrolysable silyl groups, and (ii) water; wherein: (i) at least some of the hydrolysable silyl groups of the curable polyureasil compound have been hydrolyzed with the water and condensed, thereby forming covalent intermolecular siloxane crosslinks between curable polyureasil compound molecules in the cured polyureasil compound coating; and (ii) the cured polyureasil compound coating is sufficiently crosslinked with the intermolecular siloxane crosslinks to form a networked polymer.

In another aspect, the disclosure relates to a coated composite article comprising: (a) a substrate; and (b) a cured polyureasil compound as a coating on a surface of the substrate, the cured polyureasil compound coating comprising the hydrolysis and condensation reaction product of (i) a curable polyureasil compound comprising (A) a hydrocarbon moiety comprising at least 2 urea groups and (B) at least 6 hydrolysable silyl groups linked to the hydrocarbon moiety via at least one of the urea groups, and (ii) water; wherein: (i) at least some of the hydrolysable silyl groups of the curable polyureasil compound have been hydrolyzed with the water and condensed, thereby forming covalent intermolecular siloxane crosslinks between curable polyureasil compound molecules in the cured polyureasil compound coating; (ii) the cured polyureasil compound coating is sufficiently crosslinked with the intermolecular siloxane crosslinks to form a networked polymer; and (iii) the curable polyureasil compound is the only source of intermolecular siloxane crosslinks the cured polyureasil compound coating.

Various refinements and extensions of the foregoing coated composite articles are possible. For example, the substrate can be a metallic substrate and the cured polyureasil compound coating can reduce or prevent corrosion of the metallic substrate (e.g., comprising aluminum such as elemental aluminum or an aluminum alloy). In a refinement, the cured polyureasil compound coating can be covalently bonded to the metallic substrate via a —SiO— functional group. In another refinement, the coated article further comprises: (c) optionally a polymeric primer as a coating on a surface of the cured polyureasil compound opposite the substrate; and (d) a polymeric topcoat as a coating on a surface of the polyurethane primer (when present) opposite the cured polyureasil compound or on a surface of the cured polyureasil compound opposite the substrate (when no primer is present). In another refinement, the cured polyureasil compound coating further comprises a corrosion inhibitor selected from the group consisting of 8-hydroxyquinoline, benzimidazole, mercaptobenzothiazole, mercaptobenzimidazole, and combinations thereof.

Additional features of the disclosure may become apparent to those skilled in the art from a review of the following detailed description, taken in conjunction with the drawings, examples, and appended claims.

BRIEF DESCRIPTION OF THE DRAWINGS

For a more complete understanding of the disclosure, reference should be made to the following detailed description and accompanying drawings wherein.

Figure 1:
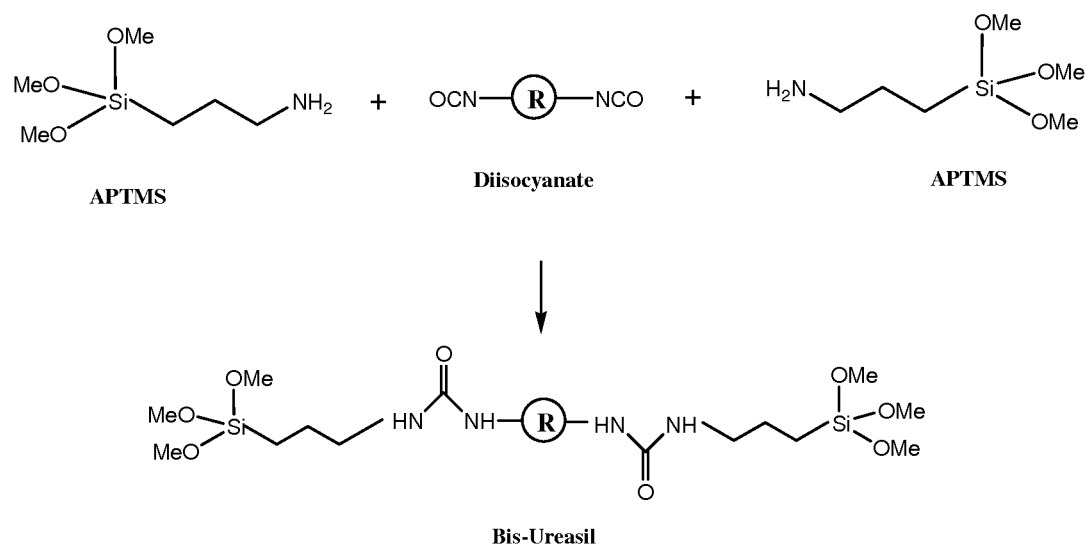
FIG. 1 illustrates a general reaction scheme for forming a curable polyureasil compound according to the disclosure.

While the disclosed processes, compositions, and methods are susceptible of embodiments in various forms, specific embodiments of the disclosure are illustrated in the drawings (and will hereafter be described) with the understanding that the disclosure is intended to be illustrative, and is not intended to limit the claims to the specific embodiments described and illustrated herein.

DETAILED DESCRIPTION

The disclosure generally relates to curable polyureasil compounds, methods related to curing of such compounds via hydrolysis and/or condensation to form coatings on a substrate, and coated articles formed from the curable polyureasil compounds.

The polyureasil compounds are generally hydrocarbon-based, including multiple urea groups and multiple hydrolysable silyl groups. As described below, the urea groups (i.e., a carbonyl group attached to two organic amine residues) provide both a convenient means for chemical synthesis of the polyureasil compounds as well as structure for internal hydrogen bonding in the resulting applied coating/film (e.g., between a nitrogen atom in one urea group and a carbonyl oxygen in a neighboring urea group). The hydrolysable silyl groups can be hydrolyzed and subsequently condensed to provide a networked polymeric structure with siloxane/urea linkages between polyureasil compound precursors. The combination of hydrogen bonding interactions and siloxane linkages provides a dense, strong, resilient, adherent coating with favorable barrier and corrosion-resistance properties.

Curable Polyureasil Compound

A curable polyureasil compound according to the disclosure includes a hydrocarbon moiety with at least 2 urea groups (e.g., 2, 3, or 4 urea groups) and at least 6 hydrolysable silyl groups (e.g., 6, 9, 12, 18, or 24 hydrolysable silyl groups) linked to the hydrocarbon moiety via the various urea groups.

A general urea group can be represented by the structure $R_aR_bN$—(C=O)—$NR_cR_d$, such as where $R_a$ is a linker to the hydrolysable silyl groups (e.g., a hydrocarbon moiety with at least 1, 2, or 3 and/or up to 4, 6, 8, or 10 carbon atoms), $R_b$ and $R_c$ independently can be a hydrogen atom or a hydrocarbon moiety (e.g., alkyl group such as with at least 1, 2, or 3 and/or up to 4, 6, 8, or 10 carbon atoms), and/or $R_d$ is a linking moiety between other urea groups in the polyureasil compound (e.g., a hydrocarbon moiety or a heteroatom-substituted hydrocarbon moiety with at least 2, 4, 8, or 12 and/or up to 20, 30, 40, or 50 carbon atoms). The urea groups can be the same or different in a given polyureasil compound (e.g., any or all of the substituents $R_a$, $R_b$, $R_c$ and $R_d$ can be the same or different among the various urea groups). In different embodiments, the curable polyureasil compound can include at least 2, 3, or 4 and/or up to 4, 6, or 8 urea groups.

The hydrolysable silyl groups include functional groups attached to a silicon atom (e.g., 1, 2, or 3 functional hydrolysable silyl groups per silicon atom) that can be hydrolyzed under suitable conditions (e.g., when in contact with water, such as under acidic conditions) to form corresponding silanol (Si—OH) functional groups, which in turn can be condensed to form siloxane (Si—O—Si) functional groups/linkages in a cured polyureasil compound coating. The hydrolysable silyl group can include a hydrocarbon group linked via an oxygen atom to a silicon atom (e.g., Si—OR, such as alkoxy groups having 1, 2, 3, or 4 carbon atoms) and/or a halogen atom linked to a silicon atom (e.g., Si—X, such as for F, Cl, Br, or I). Examples of specific hydrolysable silyl groups include silicon-bound methoxy groups and/or ethoxy groups. The hydrolysable silyl groups are generally all the same to promote a uniform rate of hydrolysis/condensation, but the specific groups can be different in an embodiment if desired to have a distribution of different hydrolysis/condensation (e.g., a curable polyureasil compound including some methoxy groups and some ethoxy groups). In different embodiments, the curable polyureasil compound can include at least 6, 7, 8, 9, 12 and/or up to 12, 18, or 24 hydrolysable silyl groups, depending on the number of silicon atoms included and the degree of functionality of each silicon atom.

In an embodiment, the curable polyureasil compound can be represented by the following Structure I:

$$R-[-NR_3-(C=O)-NA_1A_2]_x \qquad (I)$$

In Structure I, (a) R can be a hydrocarbon moiety or a heteroatom-substituted hydrocarbon moiety (e.g., N, O, S substituted) containing from 1 to 50 carbon atoms (e.g., at least 2, 4, 8, or 12 and/or up to 20, 30, 40, or 50 carbon atoms), (b) $A_1$ contains hydrolysable silyl groups and can be represented by —$R_1$—$Si(R_3)_{3-y}X_y$, (c) $A_2$ can contain hydrolysable silyl groups and can be represented by —$R_2$—$Si(R_3)_{3-z}X_z$ (i.e., with silyl groups) or H or $R_3$ (i.e., without silyl groups), (d) X can be a hydrolysable group such as an alkoxy group, an aryloxy group, a carboxyloxy group, or a halogen (e.g., having at least having 1, 2, 3, or 4 and/or up to 4, 6, 8, 10, or 12 carbon atoms for non-halogens, where X can be the same or different on any particular silicon atom), (e) $R_1$ and $R_2$ can be a hydrocarbon moiety or a heteroatom-substituted hydrocarbon moiety (e.g., N, O, S substituted) containing from 1 to 20 carbon atoms (e.g., at least 2, 4, 8, or 12 and/or up to 4, 8, 12, 16, or 20 carbon atoms, where $R_1$ and $R_2$ can be the same or different), and (f) $R_3$ can be hydrogen or a hydrocarbon moiety or a heteroatom-substituted hydrocarbon moiety (e.g., N, O, S substituted) containing from 1 to 20 carbon atoms (e.g., at least 2, 4, 8, or 12 and/or up to 4, 8, 12, 16, or 20 carbon atoms). $R_3$ can be selected in its various instances (e.g., explicitly illustrated in Structure I or as a component of $A_1$ or $A_2$) to be the same or different. The value x corresponds to the number of urea groups in the curable polyureasil compound and can be at least 2, 3, 4 and/or up to 3, 4, 6, 8, or 10. The specific selections for $R_1$-$R_3$, $A_1$, $A_2$, and X can be the same or different in each of the "x" instances of the urea-containing group of Structure I (e.g., for x=2 or higher, the substituents in the repeated unit [—$NR_3$—(C=O)—$NA_1A_2$] can be the same or different). The values y and z correspond to the number of hydrolysable silyl groups in $A_1$ or $A_2$ (i.e., when $A_2$ is not H or $R_3$), respectively, and they independently can be 1, 2, or 3. The product (x)(y) or (x)(y+z) can reflect the total number of hydrolysable silyl groups in the curable polyureasil compound and suitably can be at least 6 or more than 6.

The hydrocarbon groups/moieties in the various components of the curable polyureasil compound an of Structure I generally can include saturated or unsaturated, linear or branched aliphatic hydrocarbon groups, alicyclic hydrocarbon groups, aryl hydrocarbon groups, and heteroatom-including analogs/derivates of the same (e.g., including N, O, S heteroatoms). The hydrocarbon groups (R, $R_1$, $R_2$, or $R_3$) additionally can include hydrolysable silyl groups (i.e., in addition to those explicitly illustrated in $A_1$ and $A_2$). As noted above, the hydrolyzable X groups can be the same in all instances in the curable polyureasil compound to promote uniform hydrolysis and condensation rates, but they can be different in alternate embodiments. In another embodiment, one or both of $R_3$ as bound to the urea nitrogen in Structure I and $A_2$ can be hydrogen atoms to promote film cohesion via interchain hydrogen-bonding with neighboring carbonyl oxygens.

The disclosed curable polyureasil compound has a high reactivity (e.g., promoting rapid and extensive curing), a robust chemical structure (e.g., providing resistance to degradation), and excellent mechanical properties once cured (e.g., in the form of a film on a substrate). The specific chemical structure and functional groups of the curable polyureasil compound can be selected and synthesized by reaction between one or more aminosilanes (e.g., aminoalkyl[mono-, di-, or tri-]alkoxysilanes) with one or more polyisocyanates (e.g., di- or tri-isocyanates), for example in equivalent (molar) proportions based on the amino and isocyanate functional groups, to yield polyureasil compounds. Thus, the hydrocarbon moiety of the polyureasil compound has a structure corresponding to a reaction product resulting from an amination reaction of the polyisocyanate with the aminosilane. The strong hydrogen-bonding interactions between organic components within the cross-linked hybrid network (e.g., through urea-linkages) provides improved coating performance.

Suitable polyisocyanates useable as a precursor to the hydrocarbon moiety of the curable polyureasil compound include any organic compound having at least two free isocyanate (—N=C=O) groups per molecule (e.g., 2, 3, or 4 isocyanate groups), for example having about 4 to 20 carbon atoms (in addition to nitrogen, oxygen, and hydrogen) and including aliphatic, cycloaliphatic, aryl-aliphatic, and aromatic polyisocyanates, as well as products of their oligomerization, used alone or in mixtures of two or more. Suitable polyisocyanates are diisocyanate compounds, for example having the general form Y(NCO)$_2$, with Y representing a bivalent aliphatic hydrocarbon group having from 4 to 12 carbon atoms, a bivalent cycloaliphatic hydrocarbon group having from 6 to 15 carbon atoms, a bivalent aromatic hydrocarbon group having from 6 to 15 carbon atoms or a bivalent aryl-aliphatic hydrocarbon group having from 7 to 15 carbon atoms. Higher polyisocyanates can provide a higher degree of networking in the cured polymer (e.g., represented by Y(NCO)$_3$ or Y(NCO)$_4$ for 3 or 4 isocyanate groups, respectively, where Y is a trivalent or tetravalent group analogous to that above).

Specific examples of suitable aliphatic polyisocyanates include alpha, omega-alkylene diisocyanates having from 4 to 20 carbon atoms, such as hexamethylene-1,6-diisocyanate (HDI), 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, and the like. Specific examples of suitable cycloaliphatic polyisocyanates include dicyclohexylmethane diisocyanate, isophorone diisocyanate (IPDI), 1,4-cyclohexane diisocyanate, 1,3-bis-(isocyanatomethyl)cyclohexane, and the like. Specific examples of suitable aralipathic polyisocyanates include m-tetramethyl xylylene diisocyanate, p-tetramethyl xylylene diisocyanate, 1,4-xylylene diisocyanate, 1,3-xylylene diisocyanate, and the like. Examples of suitable aromatic polyisocyanates include 4,4'-diphenylmethylene diisocyanate (MDI) and its isomers, toluene diisocyanate (TDI) and its isomers, naphthalene diisocyanate, their oligomeric forms and the like. An example of a suitable triisocyanate includes a trimer of isophorone diisocyanate (IPDI trimer).

Suitable animosilanes useable as a precursor to the hydrolysable silyl groups of the curable polyureasil compound include any organic compound having one or more amine groups (e.g., free primary or secondary amino group) and one or more hydrolysable silyl groups per molecule (e.g., 1, 2, 3, 4, 5, or 6 hydrolysable silyl groups with 1 or 2 corresponding silicon atoms). The animosilanes are suitably monoamines. The animosilanes can have a hydrocarbon group having at least 1 or 2 and/or up to 6 or 10 carbon atoms that links the amino group with the hydrolysable silyl groups (e.g., with the amino group and the corresponding silicon atom at opposing terminal ends of the linking group). Suitable aminosilanes can be represented by the form $NHA_1A_2$, where $A_1$-$A_2$, X, and $R_1$-$R_3$ are as described above for the curable polyureasil compound. Specific examples of suitable aminosilanes include (3-aminopropyl)trialkoxysilane (e.g., including trimethoxy (APTMS) and triethoxy (APTES) species) and bis(3-trialkoxysilylpropyl)amine (e.g., including trimethoxy (BTMSPA) and triethoxy (BTESPA) species).

Figure 1A:
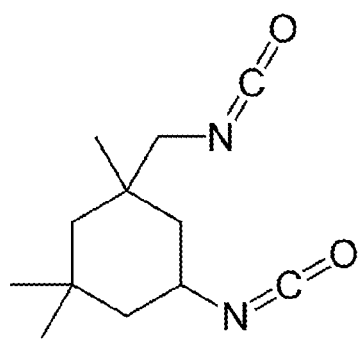
FIG. 1A illustrates isophorone diisocyanate (IPDI) as a representative diisocyanate in the reaction scheme of FIG. 1.

FIG. 1 illustrates a general reaction scheme for forming a curable polyureasil compound according to the disclosure. In the illustrated example, a generic diisocyanate is reacted with APTMS to form a cureable bis-ureasil compound having two urea groups and six hydrolysable silyl methoxy groups. When the diisocyanate is, for example, IPDI (shown in FIG. 1A), the generically illustrated "R" hydrocarbon core of the diisocyanate and bis-ureasil compound corresponds to the methyl-substituted cyclohexyl core group of IPDI. In other general embodiments (not shown) and in the context of Structure I above, $A_1$ can be represented by —$C_3H_6$—Si(OCH$_3$)$_3$ and $A_2$ can represented by H when the aminosilane is APTMS. Similarly, $A_1$ can be represented by —$C_3H_6$—Si(OC$_2$H$_6$)$_3$ and $A_2$ can represented by H when the aminosilane is APTES. Likewise, $A_1$ and $A_2$ can be represented by —$C_3H_6$—Si(OCH$_3$)$_3$ when the aminosilane is BTMSPA. Similarly, $A_1$ and $A_2$ can be represented by —$C_3H_6$—Si(OC$_2$H$_6$)$_3$ when the aminosilane is BTESPA.

Curing Process

The curable polyureasil compound in any of the various embodiments to the disclosure can be cured with water to form a cured polyureasil compound having covalent intermolecular siloxane/urea crosslinks in the networked polymer product. The intermolecular crosslinks relate to the formation of covalent bonds between originally separate curable polyureasil molecules. In some instances, intramolecular crosslinking is possible in the networked polymer product as well. The curing process generally involves a serial, two-step mechanism in which at least some of the hydrolysable silyl groups in the curable polyureasil compound are first hydrolyzed to silanol groups (e.g., generally an acid-catalyzed aqueous reaction), and the silanol groups are then condensed to form intermolecular siloxane crosslinks. Condensation/crosslinking to form a siloxane link can occur between two silanol groups (e.g., to yield water as a byproduct) or between a silanol group and an unhydrolyzed silyl group from the curable polyureasil compound (e.g., to yield a corresponding alcohol from an alkoxy hydrolysable group or a corresponding acid form a halogen hydrolysable group). The resulting networked polymer includes a silica network sol with individual units linked via the urea-containing hydrocarbon moiety of the curable polyureasil compound (e.g., including siloxane cage-like structures linked via urea-containing hydrocarbon moiety at cage vertices).

In an extension of the curing process that further involves the coating of the polyureasil compound onto a substrate, the curable polyureasil compound is first partially cured (e.g., partially, substantially, or completely hydrolyzed but without partial, substantial, or complete condensation) in the absence of the substrate. The partially cured polyureasil compound is then applied to the substrate by any convenient means (e.g., dipping, immersing, spraying, coating, etc. the substrate with a solution/mixture including the partially cured polyureasil compound). Once applied, the partially cured polyureasil compound on the substrate continues to cure (e.g., including further hydrolysis where appropriate as well as condensation for network polymer formation), thereby forming the cured polyureasil compound as a coating on the substrate. Once applied to the substrate and after substantial evaporation of water and any organic solvent, a rapid and high degree of condensation is desirable to obtain films with good barrier properties. The rates of such gel-formation reactions are a function of temperature, among other factors. Suitably, the post-application cure can be performed at ambient temperature (e.g., 20° C. to 30° C.) or at higher temperatures (e.g., ambient temperature up to 50° C., 75° C., 100° C., 150° C., or 200° C.).

Figure 2:
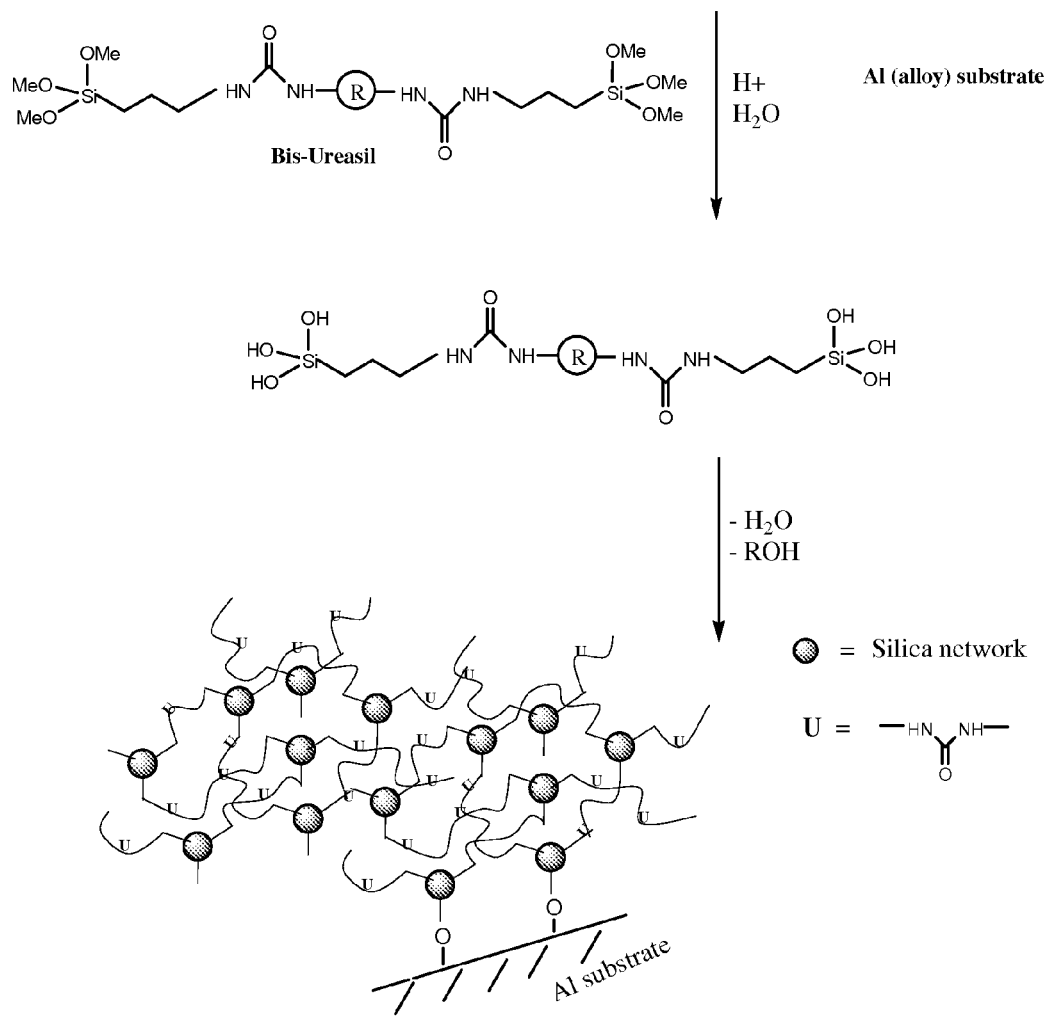
FIG. 2 illustrates a general process for forming a cured polyureasil/coating according to the disclosure.

FIG. 2 illustrates a general curing process according to the disclosure. The curable polyureasil compound (top) is initially hydrolyzed to form a silanol analog to the curable polyureasil compound (middle), and the silanol groups then condense to form intermolecular crosslinks in a networked polymer product (bottom; illustrated as a coating on a substrate). The silanol analog can be represented by the above Structure I, where some, most, or all of the hydrolysable groups X are replaced by —OH. As described in more detail below, the curable polyureasil compound is suitably at least partially hydrolyzed prior to coating or other contact with an intended substrate (e.g., an aluminum or aluminum alloy as illustrated). After an initial pre-hydrolysis period (or induction period) prior to substrate contact, the (partially) hydrolyzed polyureasil compound continues to hydrolyze and condense on the substrate to form an adherent polymer coating.

It is desirable increase the relative silanol content of a coating solution (sol) including the polyureasil compound before application onto the substrate in order to achieve a resulting coating with good barrier properties. The rate of hydrolysis for different sol-gel precursors (i.e., curable polyureasil compounds) can significantly vary under given reaction conditions, so systems containing two or more precursors of different reactivity (e.g., whether different compounds altogether or analogous precursors with different hydrolysable groups) can result in a broad distribution of species at various points in the curing reaction path. For example, excessive hydrolysis and condensation can be observed in the more reactive precursor species, while little to no hydrolysis and/or condensation may be observed in the less reactive precursor species. A relatively low silanol content can result in lower a number of covalent bonds with a metal substrate, thus forming a coating with reduced corrosion resistance and substrate adhesion. The curable polyureasil compound suitably has 6 or more (e.g., 6, 9, 12, 18, or 24) hydrolysable silyl groups of the same type (e.g., methoxy or ethoxy). The polyureasil compound, when hydrolyzed in aqueous acidic solution, exhibits a fairly uniform, rapid rate of hydrolysis (e.g., compared to a metal alkoxide or silicon tetraalkoxide such as TEOS). The high functionality of the polyureasil compound helps produce a denser film, and the absence of metal or silicon alkoxide in some embodiments makes possible a single step and faster process. The curable polyureasil compound and related induction/coating/curing process provides improved control over the composition of the coating bath solution (e.g., in terms of relative silanol content) and hence the performance/properties of the corresponding pretreatments and coatings. For example, the curable polyureasil compound in the initial reaction mixture is suitably pre-hydrolyzed for a sufficient time during an induction period such that least 50%, 60%, 70%, or 80% and/or up to 80%, 90%, 95%, or 100% of the original hydrolysable silyl groups (number or molar basis) have been hydrolyzed to silanol groups. Alternatively or additionally, the induction time can be selected to avoid excessive condensation, such that not more than 5%, 10%, 20%, or 30% of the original hydrolysable silyl groups (number or molar basis) have been condensed to siloxane linking groups.

The curable polyureasil compound is suitably provided in the form of an aqueous mixture that serves as an initial pre-hydrolysis (induction) medium as well as a coating/dipping solution for subsequent substrate application. In addition to water and the curable polyureasil compound, the aqueous mixture can further include an organic solvent for the curable polyureasil compound, a (hydrolysis) catalyst, a corrosion inhibitor, and a silane crosslinker. Suitable amounts for the various mixture components relative to the mixture as a whole can include: at least 5 wt. % or 10 wt. % and/or up to 30 wt. % or 40 wt. % for the curable polyureasil compound, at least 2 wt. % or 10 wt. % and/or up to 50 wt. % or 70 wt. % for water, at least 10 wt. % or 20 wt. % and/or up to 50 wt. % or 50 wt. % for the organic solvent, at least 0.5 wt. % or 1 wt. % and/or up to 3 wt. % or 5 wt. % for the catalyst, and at least 0.1 wt. % or 1 wt. % and/or up to 3 wt. % or 5 wt. % for the corrosion inhibitor (when present). Alternatively or additionally, the corrosion inhibitor can be present in an amount such that its concentration in the final cured film is at least 0.1 wt. %, 0.5 wt. %, or 1 wt. % and/or up to 3 wt. %, 5 wt. %, or 10 wt. %.

The addition of a water-miscible organic solvent that is compatible (e.g., capable of solvating) the curable polyureasil compound can provide sufficient phase stability to the mixture and can control the equilibrium reaction rates in the curing system. The water/solvent ratio in the mixture can be selected to control the properties of the resulting coating. The solvent is suitably an alcohol such as methanol, ethanol, (iso)propanol, and mixtures thereof. The particular alcohol solvent can be selected to correspond to the alcohol that is liberated from the curable polyureasil compound upon hydrolysis (e.g., an alcohol corresponding to the alkoxy group on the silicon atom). Other non-alcohol solvents that are water-miscible and compatible with polyureasil precursor also can be used, for example including acetone and/or tetrahydrofuran (THF).

The catalyst added to the mixture is suitably a Brønsted acid, for example a carboxylic acid such as formic acid, acetic acid, and/or lactic acid. Alternatively or additionally, stronger mineral acids such as phosphoric acid, nitric acid, and/or hydrochloric acid can be used. The catalyst suitably is added to the mixture in an amount to achieve an acidic pH value to be maintained during induction/coating, for example of at least 2 or 3 and/or up to about 4, 5, or 6.

The corrosion inhibitor added to the mixture can be any suitable compound known for its corrosion-resistance and/or antioxidant properties. The presence of the corrosion inhibitor in the curing mixture allows the inhibitor to be homogeneously dispersed in the eventual cured polyureasil coating. In some embodiments, organic inhibitors are preferred over inorganic ones, as they generally have little or effect on the pH of the curing mixture, and it is desirable to carefully control the pH value in order to control the kinetics of the hydrolysis and condensation reactions in the mixture. Suitable organic inhibitors include heterocyclic organic compounds having 4 to 20 carbon atoms and one or more heteroatoms (e.g., N, O, S) along with anti-corrosion properties. Specific examples of suitable organic inhibitors include 8-hydroxyquinoline, benzimidazole, mercaptobenzothiazole, mercaptobenzimidazole, benzotriazole, and combinations thereof.

In some embodiments, the curable polyureasil compound is the only source of intermolecular siloxane crosslinks in the reaction mixture and in the resulting cured polyureasil compound (e.g., the reaction mixture is free or substantially free from other added species having hydrolysable silyl groups). As described above, it can be desirable to have only a single chemical species in the mixture that contains hydrolysable silyl groups to promote uniformity of the curing reactions in the system. Alternatively or additionally, the mixture can be free from other added sources of silicon, whether in the form of hydrolysable silyl groups, cured siloxane crosslinks, or otherwise. In other embodiments, however, the reaction mixture can include a silane crosslinker to increase the crosslink density and barrier properties in the resulting cured polymer coating. Suitable silane crosslinkers can be represented by the form $Si(R_3)_{4-y}X_y$, where X and $R_3$ are as described above for the curable polyureasil compound, except that y is selected to be 2, 3, or 4. Examples of suitable silane crosslinkers include tetraethoxyorthosilicate (TEOS) and tetramethoxyorthosilicate (TMOS). Because of the generally differing rates of hydrolysis between the silane crosslinker and the curable polyureasil compound, the silane crosslinker is suitably pre-hydrolyzed to a desired degree in a separate aqueous reaction mixture (i.e., which does not contain the curable polyureasil compound), and then the (partially) hydrolyzed silane crosslinker is added to the reaction mixture containing the curable polyureasil compound for its pre-hydrolysis (induction) period. While the inclusion of the silane crosslinker generally involves an initial reaction/process step, it can provide a resulting cured polyureasil compound with improved structural properties.

Coated Article

Figure 3:
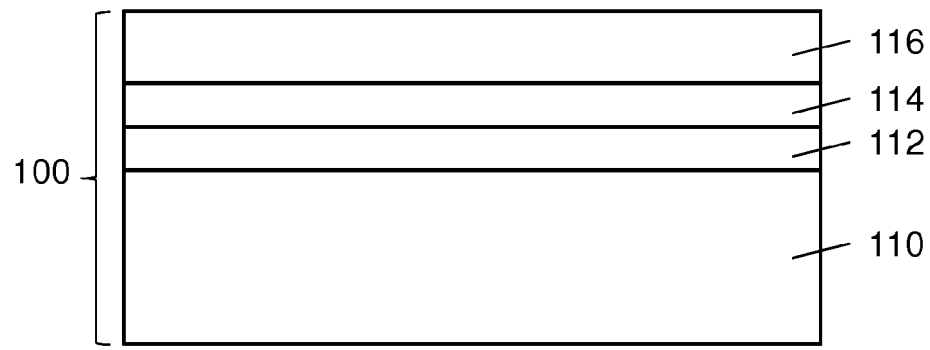
FIG. 3 illustrate a coated article with a cured polyureasil compound coating according to the disclosure.

FIG. 3 illustrates a coated article 100 according to the disclosure. The coated article 100 includes a substrate 110 having a cured polyureasil compound as a coating 112 on a surface (e.g., outer surface) of the substrate 110. The cured coating (e.g., as formed by the above method) suitably has a thickness ranging from 1 µm or 2 µm to 5 µm or 10 µm for a single coating application, and multiple coatings applied/cured in series can form a correspondingly thicker coating 112 if desired.

Figure 4:
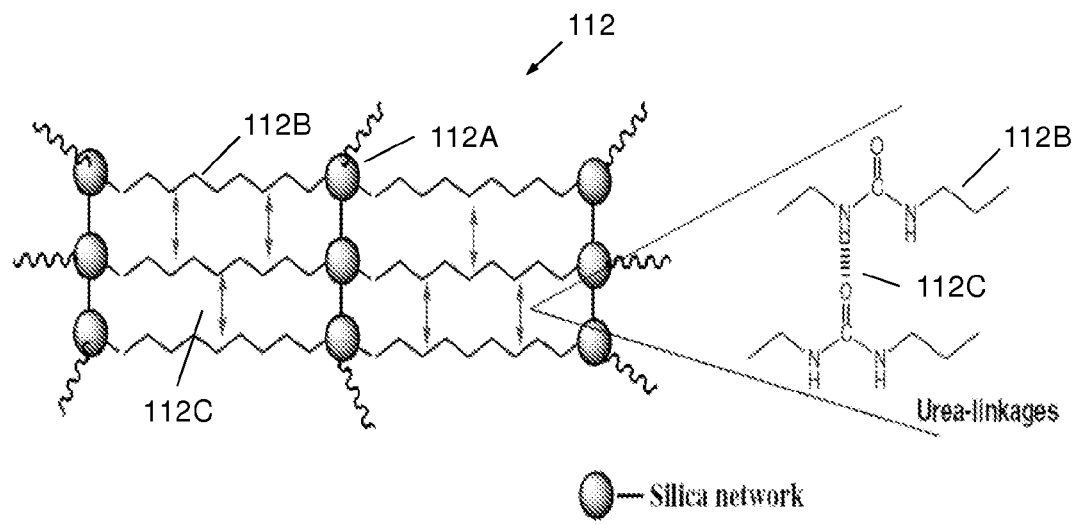
FIG. 4 illustrates an idealized representation of a cured polyureasil coating according to the disclosure.

FIG. 4 illustrates an idealized representation of the cured polyureasil coating 112. In the coating 112, condensed individual silica network units 112A are crosslinked via urea/siloxane units 112B (e.g., with urea groups interior to the illustrated linking groups 112B with siloxane groups at terminal ends of the linking group 112B and forming bonds to the silica network units 112A). As indicated by the arrows and in the expanded inset view, hydrogen bonding interactions 112C between urea groups in adjacent hydrocarbon moieties from the original curable polyureasil compound provide an additional degree of interlayer film cohesion (e.g., in addition to the covalent crosslinks) and improve the resulting barrier/anti-corrosion properties of the cured polyureasil coating 112.

The substrate 110 is not particularly limited, but it is suitably a metallic substrate 110. In this case, the cured polyureasil compound coating 112 serves to reduce or prevent corrosion of the underlying metallic substrate 110 from ambient environmental conditions. In various embodiments, the substrate can be a metal (e.g., aluminum), a metal alloy (e.g., an aluminum-containing alloy), or a non-metal. In some embodiments, the polyureasil coating 112 is adhered to the substrate via covalent linkages. Many metal substrates (M), including aluminum (Al), contain surface-bound hydroxyl groups (e.g., M—OH or Al—OH, either present natively or after surface preparation by conventional techniques) that themselves can condense during cure with silanol groups in the hydrolyzed polyureasil compound to release water and form an adherent, covalent linking functional group between the metal substrate and the cured polyureasil compound (e.g., [polymer coating]-SiOM-[metal substrate] or [polymer coating]-SiOAl-[aluminum substrate]).

In an extension, the coated article 100 optionally can include a polymeric primer 114 layer and/or a polymeric topcoat 116 layer as additional layers providing barrier/sealant/anti-corrosion properties. As illustrated in FIG. 3, the primer layer 114 is coated on an outer surface of the polyureasil coating 112 (e.g., the surface opposing that to which the substrate 110 is adhered). Similarly, the topcoat layer 116 is coated on an outer surface of the primer layer 114 (e.g., the surface opposing that to which the polyureasil coating 112 is adhered). When the primer layer 114 is not present, the topcoat layer 116 can be coated on the outer surface of the polyureasil coating 112). In addition to providing anti-corrosion properties, the polymeric primer layer 114 additionally promotes adhesion between the polyureasil coating 112 and the topcoat layer 116. Such polymeric coatings are suitably chromium-free (e.g., free from hexavalent chromium, trivalent chromium, and/or chromium in any other form). Suitable polymeric materials for the primer and topcoat are generally known and are not particularly limited, with specific examples including epoxy-, polyester-, polyurethane-, polyurea-, and acrylic-based coatings (e.g., where the primer and topcoat suitably have the same or similar base polymeric character, such as polyurethane- or polyurea-based primers/topcoats having hydrogen-bonding donor/acceptor groups for improved wetting and adhesion properties relative to the urea groups of the cured polyureasil coating).

EXAMPLES

The following examples illustrate the disclosed processes and compositions, but are not intended to limit the scope of any claims thereto. The following materials, methods, and analytical procedures generally apply to the subsequent Examples 1-3 except as where noted otherwise.

Materials and Methods: (3-Aminopropyl)trimethoxysilane (APTMS), (3-aminoproyl) triethoxysilane (APTES), bis(3-triethoxysilylpropyl)amine (BTESPA), diethylenetriamine (DETA), tetraethyl orthosilicate (TEOS), ethyl alcohol, tetrahydrofuran (THF), isopropyl alcohol (IPA), glacial acetic acid (GAA), and mercaptobenzthiazole (MBT) were reagent grade chemicals (Sigma Aldrich). Isophorone diisocyanate (IPDI), isophorone diisocyanate trimer (IPDI trimer), toluene diisocyanate (TDI), and hexamethylene diisocyanate (HDI) were commercial samples (Bayer Material Science). All materials were used as received.

Substrate Preparation and Coating: Aerospace aluminum alloy 2024 T3 with copper as the primary alloying element in the form of 2"×3" panels was used as a test substrate for coating application and corrosion resistance testing. Prior to coating, panels were hand scrubbed using a maroon SCOTCH-BRITE with 10% solution of BRULIN 815 GD detergent in DI water and then rinsed with DI water. They were then immersed in 10% solution of BRULIN 815 GD detergent in DI water at minimum 142° F., followed by washing with DI water. Then the panels were deoxidized for 2 min in phosphoric acid-based deoxidizing solution, followed by DI water rinse and drying, and were then stacked for 24 h before being used for application. Before coating application all the panels were washed with DI water for removal of any loose dirt on the surface. Once prepared, coatings were applied at room temperature (25-30° C.) by dip-coating method at standard withdrawal speed of 15-17 cm/min, with residence time being 15-20 seconds. After application, panels were placed vertically in a panel stacker, for air drying. The typical dry-film thickness of coating was about 2-5 microns.

Anti-Corrosion Characterization of Coatings: Substrates coated with a cured polyureasil compound were characterized for accelerated corrosion performance by neutral salt-fog test—ASTM B117 salt-spray test—and were monitored for varying lengths of time. The performance rating of samples was done as per ASTM D 610, PRA-IT-004, SSPC-VIS2 (Publication no. 00-08, ISBN-1-889060-48-8). Salt spray results were expressed on a scale from 0 to 10 relative to a hexavalent-chromium coated control substrate, which was assigned a reference value of 10. As illustrated in the following examples, coated metallic substrates according to the disclosure suitably exhibit a neutral salt-fog corrosion resistance rating of at least 6 (e.g., at least 6, 7, 8, or 9 up to a maximum of 10 for ASTM B117 salt spray test relative to the hexavalent chromium reference) when measured at 500 hours or 1000 hours. The corrosion resistance ratings reflect the cured polyureasil-coated substrate alone (e.g., without additional polymeric layers, topcoats but including anti-corrosion inhibitors that may be incorporated into the cured polyureasil layer itself). Samples also were tested for hydrolytic stability using 4-h boiling water immersion test. The relevant analytical methodologies are incorporated herein by reference.

Comparative Example 1: Two-Step Coating Process with Bis-Ureasil and TEOS

Comparative Example 1 reflects comparative data using a two-step coating process with various bis-ureasils and TEOS as two different species containing hydrolysable silyl groups. The data were originally presented in Kakde and Mannari, "Advanced chrome-free organic-inorganic hybrid pretreatments for aerospace aluminum alloy 2024-T3—application of novel bis-ureasil sol-gel precursors," *J. Coat. Technol. Res.*, Volume 6, Number 2, 201-211 (2009; presented Oct. 14-16, 2008) ("Kakde"), which is incorporated herein by reference in its entirety.

Four bis-ureasil compounds, differing in chemical structures, were synthesized by reaction of an amine functional silane, APTMS or APTES, with different diisocyanate compounds, namely IPDI, HDI, and TDI, using a 2:1 molar ratio. The following general procedure was used for synthesis of bis-ureasils. Into a three-necked reaction flask, provided with a mechanical stirrer, thermometer, and an inlet for nitrogen gas, calculated amounts of dry THF and APTMS were charged and the mixture was stirred for 10 min until clear solution was obtained. Diisocyanate was then slowly added from an addition funnel, under stirring at room temperature. After complete addition of diisocyanate, the mixture was stirred for 2.0 h. Completion of reaction was followed by FTIR spectroscopy for disappearance of —NCO absorption band at 2,270 $cm^{-1}$. THF was then removed under rotary vacuum evaporator at 50° C. The product bis-ureasil was then dissolved in dry ethanol (30-70% solids) and stored in plastic bottles under desiccator. In synthesis of TDI-based bis-ureasil, IPA was used as solvent in place of THF, for the reasons of solubility and stability of the product. Based on the type of diisocyanate used, the bis-ureasils were designated by letters C (IPDI), I (HDI), L(TDI). A bis-ureasil was also synthesized from APTES and IPDI, following the stated general procedure and was designated as T.

The preparation of sols and their substrate application were carried out in the following stepwise manner:

Step-1: Pre-hydrolysis of TEOS: TEOS was added to the mixture of ethanol and double distilled water, and GAA (acid catalyst). The pH of the solution was varied in the range of 2.6-2.9. The mixture was stirred under magnetic stirrer, at room temperature for 24-72 h.

Step-2: Post-addition of bis-ureasil: Appropriate quantity of bis-ureasil compound was then added into pre-hydrolyzed TEOS solution (step-1) and solid contents were adjusted (~25% by wt.) using deionized water and ethanol. The pH of the solution was varied between 3.25 and 5. Bis-ureasil/TEOS ratio was varied from 0.5 to 2.0. For all the samples studied, the ratio of water/ethanol and solid contents was maintained constant.

Table 1 below reproduces some representative anti-corrosion data from Kakde.

TABLE 1

Anti-Corrosion Performance of Bis-Ureasil (BU)/TEOS Coatings

| Sample ID | Isocy-anate | Amino-silane | TEOS/BU Ratio | 4-hr Boiling Water Test | Salt Spray Test 500 hr | Salt Spray Test 1000 hr |
|---|---|---|---|---|---|---|
| C | IPDI | APTMS | 1/1.5 | No discolor. | 9-P | 7-P |
| I | HDI | APTMS | 1/1.5 | No discolor. | Failed (24 hr) | |
| L | TDI | APTMS | 1/1.5 | No discolor. | 5-P | 4-P |
| T | IPDI | APTES | 1/1.5 | No discolor. | 7-P | 5-P |

Example 2: Single-Step Coating Process with Bis- and Poly-Ureasils

Example 2 illustrates a single-step coating process with various bis- and tris-ureasils as the sole coating species containing hydrolysable silyl groups (i.e., without TEOS or other silane crosslinker).

Bis- and tris-ureasils with hydrolysable silyl group functionalities of 6, 9, and 18 were formed as generally described in Comparative Example 1 using a di-functional isocyanate (IPDI) or a tri-functional isocyanate (IPDI trimer) in combination with a tri-functional aminosilane (APTES) or a hexa-functional aminosilane (BTESPA). The curable polyureasils formed are summarized in Table 2 below.

TABLE 2

Summary of Curable Bis- and Tris-Ureasil Precursors

| Sample ID | Isocyanate | Aminosilane | Net Silyl Group Functionality |
|---|---|---|---|
| A | IPDI | APTES | 6 |
| B | IPDI trimer | APTES | 9 |
| C | IPDI trimer | BTESPA | 18 |

A coating solution bath was formed by adding the bis- or tris-ureasil compound (solution in dry ethanol) to a calculated quantity of ethanol-and-water mixture containing glacial acetic acid as catalyst. The bis- or tris-ureasil compound was selected to have a weight concentration in the bath between 5 wt. % and 40 wt. %, and the ethanol/water weight ratio of the liquid solution medium was selected to be between 1:0.25 and 1:2.5. The solution was adjusted to pH ranging from 3.0-4.5. The coating solution was stirred with a magnetic stirrer at temperature of 25-35° C. to provide an induction step for hydrolysis of the ureasil precursor. The coating solution was ready for substrate application (dipping) after an induction time of about 20-30 minutes.

Sample substrate panels of the aluminum alloy 2024 T3 (3"×5") were pre-cleaned as described above. The panels were coated with the aqueous bath solution at room temperature, using a dip-coating instrument, at the controlled rate of about 10-20 cm/min. The dip-coated panels were allowed to stand at room temperature for 30 minutes, followed by further curing/drying in oven at varying temperature-time conditions (e.g., under ambient/room temperature conditions for 48 hr and ranging up to 200° C. for 30 min). The sample panels were evaluated for various anti-corrosion properties as described above. The data in Table 3 below were obtained by ambient condition drying for 30 min, followed by heating at 120° C. for 30 min in an oven.

Pretreatment films were characterized for DC polarization resistance (electrochemical test) and neutral salt for test as per ASTM B-117 (accelerated corrosion test). For the DC polarization study, a 5% NaCl solution was used as the electrolyte. The results showed that a dense and adherent hybrid nanocomposite coating was formed on the surface that showed good corrosion resistance when tested by the salt-fog test (ASTM B-117) and by DC polarization resistance.

As shown in Table 3 below, the coatings resulting from the higher functionality polyureasil precursors (e.g., more than 6 hydrolysable silyl groups per precursor molecule) showed excellent performance. Specifically, with an increase in silyl group functionality from 6 to 9 and higher, the corrosion resistance performance substantially improves. Similarly, for samples B and C of Example 2, the corrosion resistance is comparable to the best sample C of Comparative Example 1, yet the single-component, higher-functionality coating (i) is formed in a simpler, 1-step process as compared to a 2-step process and (ii) requires about 50-150 times less initialization time before substrate coating can begin (c.f., about 0.5 hr used for a single induction step in Example 2 relative to a minimum 24-72 hr process for Example 1 to complete TEOS pre-hydrolysis prior to bis-ureasil induction). The single-component, higher-functionality coating can be obtained with a high degree of crosslinking, thus eliminating the need for an additional crosslinking component and additional time in a TEOS-based system. These results also show that some of the coating systems can perform very close to that of a hexavalent chromium-based system.

TABLE 3

Anti-Corrosion Performance of Bis- and Tris-Ureasil Coatings

| | Salt Spray Corrosion Rating (ASTM B117/D610-07) | | |
|---|---|---|---|
| Time (hr) | Sample A | Sample B | Sample C |
| 0 | 10-P | 10-P | 10-P |
| 24 | 9-P | 10-P | 10-P |
| 48 | 7-P | 10-P | 10-P |
| 72 | 7-P | 10-P | 10-P |
| 168 | 6-P | 7-P | 7-P |
| 240 | 5-P | 7-P | 7-P |
| 410 | 5-P | 7-P | 7-P |
| 510 | 5-P | 7-P | 7-P |
| 610 | 5-P | 7-P | 7-P |
| 710 | 5-P | 7-P | 7-P |

Example 3: Two-Step Coating Process with Bis-Ureasil, TEOS, and Corrosion Inhibitor Comparative Example 1 was repeated, except that an organic corrosion inhibitor was also added under stirring to the coating solution so that the corrosion inhibitor would be incorporated into the applied cured coating at a desired concentration. Specifically, sample C (i.e., IPDI-APTMS bis-ureasil with TEOS crosslinker) was reproduced with the addition of mercaptobenzthiazole (MBT) at levels of 0%, 1%, 2%, and 3% (w/w) in the final film. As shown in Table 4 below, the addition of the organic corrosion inhibitor substantially improved the anticorrosion properties of the coating. In Table 4, a hexavalent chromium panel was used as a reference with a relative rating of 10 for the salt spray test, the boiling water test, and the DC polarization test.

TABLE 4

Anti-Corrosion Performance of Bis-Ureasil (BU)/TEOS/MBT Coatings

| BU Precursor | MBT wt. % | Salt Spray Rating (500 hr) | Boiling Water Test | DC Polarization Rating |
|---|---|---|---|---|
| C (IPDI-APTMS) | 0% | 8 | 10 | 7.5 |
| C (IPDI-APTMS) | 1% | 8 | 10 | 7.5 |
| C (IPDI-APTMS) | 2% | 9 | 10 | 8 |
| C (IPDI-APTMS) | 3% | 10 | 10 | 9.5 |

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the compositions, processes, kits, or apparatus are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

REFERENCES

1. T. L. Metroke, R. Parkhill, E. T. Knobbe, Proceedings of the Material Research Society Symposium, vol. 576, 1999, p. 293.
2. Report of the Ad Hoc Committee on Life Extension and Mission Enhancement for Air Force Aircraft, Vol. 1, Executive Summary, US Air Force Scientific Advisory Board Report No. SAB-TR-94-01, Washington, D.C., 1994.
3. C. S. Jeffcoate, N. N. Voevodin, M. Khobaib, L. B. Reynolds, W. K. Kuhn, M. S. Donley, Proceedings of 43rd Int. SAMPE Symposium, Anaheim, Calif., 31 May_4 Jun. 1998.
4. Department of Defense Index of Specifications and Standards, Standardization documents Order Desk, Bldg. 4D, 700 Robbins Ave, Philadelphia, Pa. 19111-5094.
5. M. S. Vukasovich, D. R. Robitaille, J. Less-Common Met. 54, 1977.437_448.
6. S. R. Taylor, IEEE Trans. Electr. Insul. 24 5. 1989.
7. F. Mansfeld, Issue AA: Schlumberger Technologies, Billerica, Mass., February 1993.
8. C. S. Jeffcoate, T. L. Wocken, G. P. Bierwagon, J. Mater. Eng. Perform. 6 1997.417_420.
9. A. Amirudin, D. Thiery, Prog. Org. Coat. 26 1995.1_28.
10. J. R. Macdonald, Impedance Spectroscopy, Wiley, New York, 1987.
11. A. N. Khramov, V. N. Balbyshev, N. N. Voevodin, M. S. Donley, Prog. Org. Coat. 47 (2003) 207-213.
12. T. L. Metroke, J. S. Gandhi, A. Apblett, Prog. Org. Coat. 50 (2004) 231-246.
13. A. N. Khramov, N. N. Voevodin, V. N. Balbyshev, M. S. Donley, Thin Solid Films 447-448 (2004) 549-557.
14. M. L. Zheludkevich, R. Serra, M. F. Montemor, K. A. Yasakau, I. M. Miranda Salvado, M. G. S. Ferreira, Electrochim. Acta 51 (2005) 208-217.
15. S. V. Lamaka, M. L. Zheludkevich, K. A. Yasakau, M. F. Montemor, P. Ceci'lio, M. G. S. Ferriera, Electrochem. Commun. 8 (2006) 421-428.
16. Wim J. van Ooij*, Danqing Zhu, Vignesh Palanivel, J. Anna Lamar and Matthew Stacy, Silicon Chemistry 3: (2006), 11-30.
17. R. L. Parkhill, E. T. knobbe, M. S. Donley, Prog. Org. Coat. 41 (2001) 261.
18. R. Kasemann, H. Schmidt, First European Workshop on Hybrid Organic-Inorganic Materials, Chateau de Bierville, France, 8-10 Nov. 1993, p. 171.
19. K. Blohowiak, K. Osborne, K. Krienke, D. Sekits, Proceedings of SAMPE Technical Conference, vol. 28, 1996, p. 440.
20. Blohowiak, K., Osborne, K., Krienke, K., U.S. Pat. No. 5,939,197, 2002.
21. T. Metroke, R. Parkhill, E. Knobbe, Proceedings of MRS Technical Conference, vol. 576, 1999, p. 293.
22. N. Voevodin, N. Grebasch, W. Soto, L. Kasten, J. Grant, F. Arnold, M. Donley, Progress in Organic Coatings, vol. 41, 2001, p. 287.
23. A. Vreugdenhil, V. Balbyshev, M. Donley, Journal of Coating Technology 73, (2001) 35.
24. J. Livage, Materials Science Forum 152-153 (1994) 43.
25. M. Gugliemi, Journal of Sol-Gel Science and Technology 8 (1997) 443.
26. M. S. Donley, V. N. Balbyshev, N. N. Voevodin, Progress in Organic Coatings 52 (2005) 34.
27. N. N. Voevodin, V. N. Balbyshev, M. S. Donley, Progress in Organic Coatings 52 (2005) 28.
28. C. Brinker, G. Scherer, Sol-Gel Science: The Physics and Chemistry of Sol-Gel Processing, Academic Press, San-Diego, 1990.

What is claimed is:

1. A coated composite article comprising:
(a) a metallic substrate; and
(b) a cured polyureasil compound as a coating on a surface of the metallic substrate, the cured polyureasil compound coating comprising the hydrolysis and condensation reaction product of (i) a curable polyureasil compound comprising (A) a hydrocarbon moiety comprising at least 2 urea groups and (B) at least 6 hydrolysable silyl groups linked to the hydrocarbon moiety via at least one of the urea groups, and (ii) water;

wherein:

(i) the curable polyureasil compound comprises a compound having the formula (I):

$$R-[-NR_3-CO-NA_1A_2]_x; \quad (I)$$

(ii) R is selected from the group consisting of hydrocarbons containing from 1 to 50 carbon atoms and heteroatom-substituted hydrocarbons containing from 1 to 50 carbon atoms;
(iii) $A_1$ is represented by $-R_1-Si(R_3)_{3-y}X_y$;
(iv) $A_2$ is represented by $-R_2-Si(R_3)_{3-z}X_z$ or H;
(v) X is a hydrolysable group independently selected from the group consisting of alkoxy groups, aryloxy groups, carboxyloxy groups, and halogens;
(vi) $R_1$ and $R_2$ are independently selected from the group consisting of (A) hydrocarbons containing from 1 to 20 carbon atoms and heteroatom-substituted hydrocarbons containing from 1 to 20 carbon atoms when $A_2$ is not H, and (B) hydrocarbons containing from 2 to 20 carbon atoms and heteroatom-substituted hydrocarbons containing from 2 to 20 carbon atoms when $A_2$ is H;
(vii) $R_3$ is independently selected from the group consisting of H, hydrocarbons containing from 1 to 20 carbon atoms, and heteroatom-substituted hydrocarbons containing from 1 to 20 carbon atoms;
(viii) x is at least 2;
(ix) y is 1, 2, or 3;
(x) z is 1, 2, or 3 when $A_2$ is not H;
(xi) the number of hydrolysable groups X is at least 6;
(xii) at least some of the hydrolysable silyl groups of the curable polyureasil compound have been hydrolyzed with the water and condensed, thereby forming covalent intermolecular siloxane crosslinks between curable polyureasil compound molecules in the cured polyureasil compound coating;
(xiii) the cured polyureasil compound coating is sufficiently crosslinked with the intermolecular siloxane crosslinks to form a networked polymer;

(xiv) the curable polyureasil compound is the only source of intermolecular siloxane crosslinks the cured polyureasil compound coating; and (xv) the cured polyureasil compound coating reduces or prevents corrosion of the metallic substrate.

2. The article of claim 1, wherein the hydrolysable silyl groups are selected from the group consisting of methoxy groups, ethoxy groups, and combinations thereof bound to two or more silicon atoms.

3. The article of claim 1, wherein the curable polyureasil compound has a number of hydrolysable silyl groups ranging from 9 to 24.

4. The article of claim 1, wherein the hydrocarbon moiety has a structure corresponding to a reaction product resulting from an amination reaction of a polyisocyanate with an aminosilane.

5. The article of claim 1, wherein:
(i) $A_1$ is represented by $—C_3H_6—Si(OCH_3)_3$ or $—C_3H_6—Si(OC_2H_5)_3$ and
(ii) $A_2$ is represented by H.

6. The article of claim 1, wherein:
(i) $A_1$ is represented by $—C_3H_6—Si(OCH_3)_3$ or $—C_3H_6—Si(OC_2H_5)_3$ and
(ii) $A_2$ is represented by $—C_3H_6—Si(OCH_3)_3$ or $—C_3H_6—Si(OC_2H_5)_3$.

7. The article of claim 1, wherein:
$A_2$ is represented by $—R_2—Si(R_3)_{3-z}X_z$; and
$R_1$ and $R_2$ are independently selected from the group consisting of (A) hydrocarbons containing from 1 to 20 carbon atoms and heteroatom-substituted hydrocarbons containing from 1 to 20 carbon atoms.

8. The article of claim 1, wherein:
$A_2$ is represented by H; and
$R_1$ is selected from the group consisting of (A) hydrocarbons containing from 2 to 20 carbon atoms and heteroatom-substituted hydrocarbons containing from 2 to 20 carbon atoms.

9. The article of claim 1, wherein R is a saturated or unsaturated, linear or branched aliphatic hydrocarbon, a saturated or unsaturated alicyclic hydrocarbon, or an aryl hydrocarbon containing from 1 to 50 carbon atoms.

10. The article of claim 1, wherein the cured polyureasil compound coating is covalently bonded to the metallic substrate via a —SiO— functional group.

11. The article of claim 1, wherein the metallic substrate comprises aluminum.

12. The article of claim 1, further comprising:
(c) a polymeric primer as a coating on a surface of the cured polyureasil compound opposite the substrate; and
(d) a polymeric topcoat as a coating on a surface of the polymeric primer opposite the cured polyureasil compound.

13. The article of claim 1, wherein the cured polyureasil coating further comprises a corrosion inhibitor therein.

14. The article of claim 13, wherein the corrosion inhibitor is selected from the group consisting of 8-hydroxyquinoline, benzimidazole, mercaptobenzothiazole, mercaptobenzimidazole, and combinations thereof.

15. The article of claim 1, wherein all hydrolysable silyl groups of the curable polyureasil compound are the same.

* * * * *